Jan. 10, 1950     B. S. FLORADAY     2,494,040
VEHICLE WINDOW GUIDE
Filed Dec. 4, 1944     2 Sheets-Sheet 2
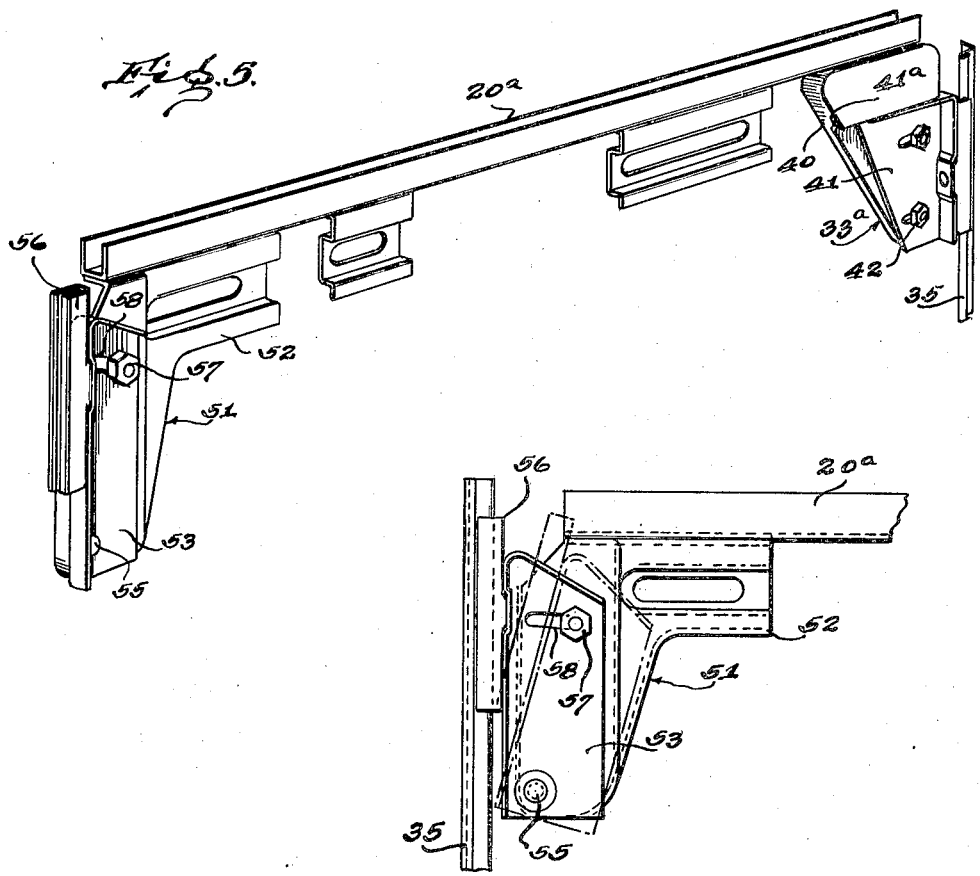
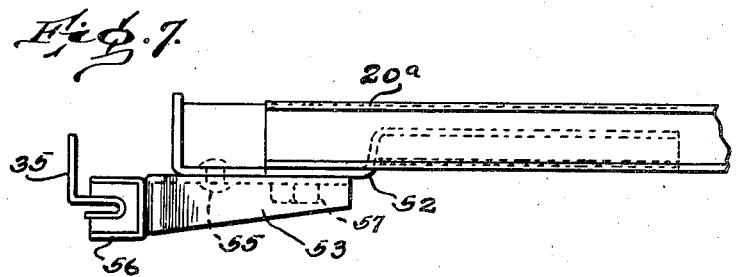
INVENTOR.
Burton S. Floraday
BY Malcolm W. Fraser
ATTORNEY Patented Jan. 10, 1950

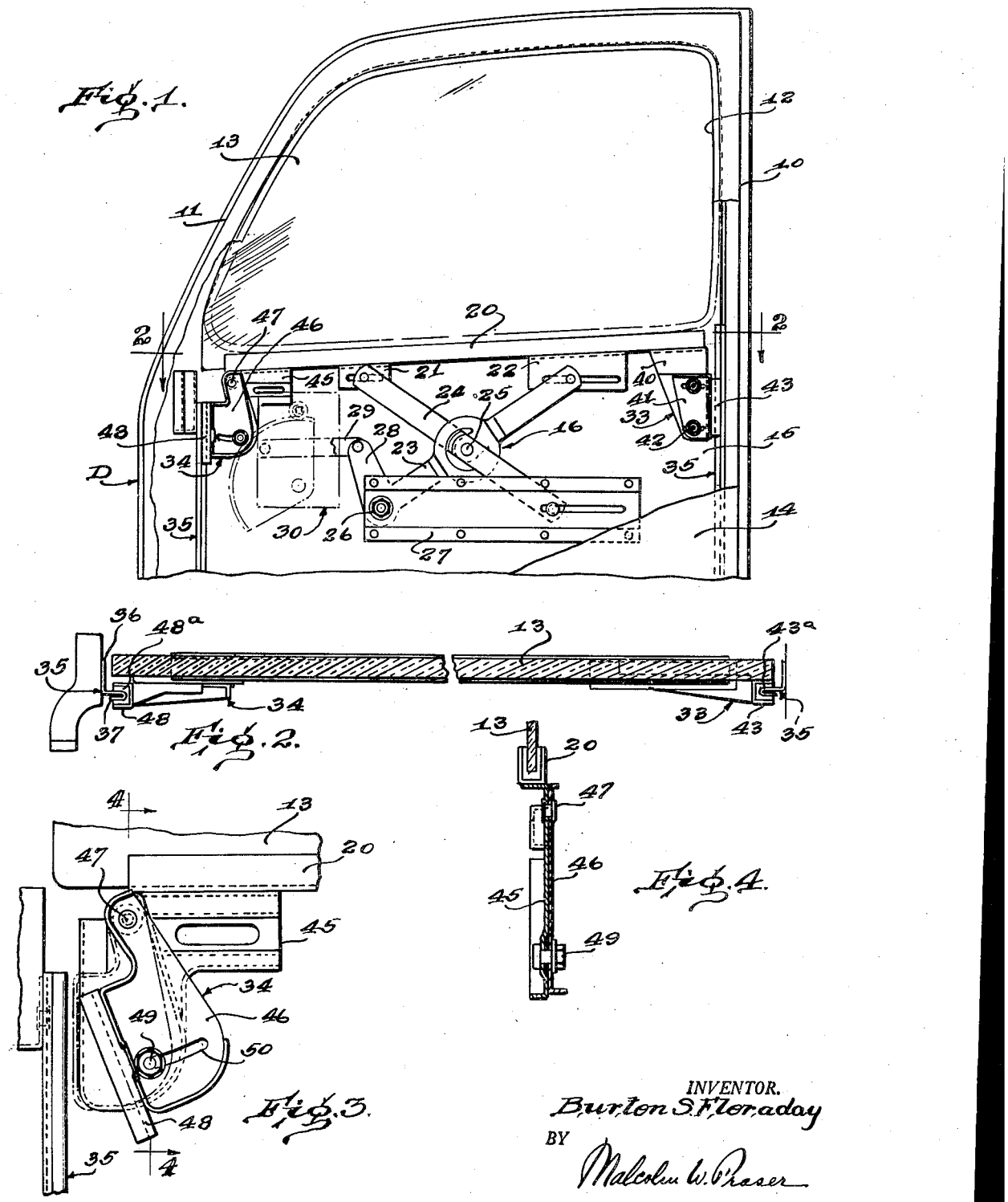

2,494,040

UNITED STATES PATENT OFFICE 2,494,040

VEHICLE WINDOW GUIDE

Burton S. Floraday, Toledo, Ohio, assignor to Marvel Equipment Corporation, Detroit, Mich., a corporation of Michigan Application December 4, 1944, Serial No. 566,553

3 Claims. (Cl. 296—44.5)

This invention relates to the guiding of window panels, such as used on vehicles and particularly automobiles. Such window panels are in the main mounted for up and down sliding movement and are actuated by regulators. They are not infrequently guided along their opposite side edge portions by guide elements arranged in up and down relation within the usual window well. In the event the window panels too snugly engage these guide elements, greater effort is required for window actuation, sometimes the friction being such that the regulators soon become damaged or broken. On the other hand, if the engagement is not sufficiently snug, the parts rattle or the window glass binds. It is a desideratum to provide a guide mounting, which can be readily and conveniently installed in position of use by an unskilled workman in such manner that the parts fit together with such exactness that free sliding window glass movement is achieved without troublesome binding or looseness.

An object is to produce a guide mounting for a window glass, which in a simple and convenient manner, overcomes the above difficulties and one which is adapted for large scale production from metal stampings.

In the drawings:

Figure 1 is an inner fragmentary elevational view of an automobile door partly broken away, illustrating an embodiment of the present invention;

Figure 2 is a sectional plan view through the mechanism taken along the line 2—2 of Figure 1;

Figure 3 is an enlarged and elevational view of a portion of the apparatus;

Figure 4 is a vertical sectional view taken on line 4—4 of Figure 3;

Figure 5 is a perspective view of another form of the invention;

Figure 6 is a side elevational view of an end portion of the structure shown in Figure 5; and Figure 7 is a top plan view of the same structure.

Referring to the drawings, an embodiment of the invention is shown in connection with a vehicle door D of substantially conventional design and which may be either a front or rear door of an automobile. It will be understood that the use of the invention, as shown and described herein, is not limited to the present application but may be readily embodied in other structures having slidable panels.

The door D includes a vertical rear pillar 10 and a sloping front pillar 11 defining the edges of a window opening 12, which is adapted to be closed by a slidable glass or window panel 13. The lower portion of the door comprises inner and outer panels 14 and 15 respectively, which together form a well, into and out of which the window 13 may be moved by a suitable window regulator mechanism 16.

In door constructions of the present type, the edge of the window panel 13 adjacent the sloping pillar 11 is moved out of the usual vertically disposed guide channel. This necessitates the provision of suitable guide mechanism arranged within the well and it is toward this end that the present invention is particularly directed.

As shown in Figures 1 and 3, especially, the window panel 13 is provided along its lower edge with a channel bar or strip 20 by which the glass is supported. The bar 20 is provided with depending horizontally disposed retainer members 21 and 22 adapted for operative connections with the window regulator mechanism 16. This mechanism comprises generally a pair of arms 23 and 24, which may be called respectively a driving arm and balance arm. These arms are pivoted together at their centers as at 25 for swinging movement through an arc of approximately 90 degrees. The upper ends of the arms (as shown in Figure 1) are secured to the depending retainers 21 and 22 and the lower end of the arm 23 is pivoted on a fixed stud 26 formed on a mounting plate 27, which is adapted to be secured to the inner door panel 14. The lower end of the arm 24 is slidably supported on the mounting plate to provide parallel motion to the upper ends of the arms and the channel bar 20. A lever arm 28 on the arm 23 adjacent the pivot 26 is connected by a link 29 to suitable remote control or regulator operating means 30 (Figure 1) which is also mounted on the inner door panel 14.

The window panel 13 is preferably guided within the well by means of guide devices 33 and 34, which are carried at each end of and depend from the channel bar 20. The guide devices slidingly engage upright rails 35, which are secured in parallel relation between the panels 14 and 15 at opposite ends of the door. The rails are formed of sheet metal and each comprises an attaching flange 36 by which it is secured in position. The flange 36 also serves as a stiffener for a projecting portion 37, which has an inturned edge to form the guide-engaging portion.

The guide device 33 is mounted on the end of the channel bar 20 adjacent the pillar 10 and includes a depending bracket 40, to which a plate 41 is adjustably secured by means of bolts 42 cooperating with horizontally elongate slots in the plate 41. The plate carries a vertically disposed rail engaging slide 43 in the form of a U-shaped channel equipped with a non-metallic U-shaped rail embracing strip 43a. When the window mechanism is assembled within the partially completed door, the plate 41 of the guide device 33 is slid to the left of Figure 1 to facilitate this operation.

At the opposite end of the channel bar 20, the other guide device 34 is arranged to engage the rail 35 and includes a depending bracket 45, which is adapted to support a swinging plate or arm 46 pivoted at its upper end for swinging movement in a vertical plane on a riveted connection 47. The plate 46 carries an elongate U-shaped channel 48 which is provided with a non-metallic rail engaging strip 48a. As shown in Figure 3, the plate 46 is rocked on its pivot to swing the channel 48 out of engagement with the rail and in this latter position, the window panel 13 and associated parts may be readily installed.

With the window mechanism in position with the channel 43 juxtaposed to its rail 35, the plate 46 is swung outwardly so that the channel 48 engages the adjacent rail. The plate is then secured in position by means of a nut threaded on a bolt 49 which passes through a hole in the member 45 and an arcuate slot 50 in the plate 46. Preferably, the length of the arcuate slot 50 is predetermined so that when the arm 46 is swung as far as possible to the left of Figure 3, the rail engaging channel 48 is properly disposed in the desired up and down position suitable for proper sliding movement on its rail. Thereafter, the plate 41 of the guide device 33 is horizontally adjusted to a position where a nice sliding fit is achieved. Thus the plate 41 enables fine adjustment to be effected to the end that the parts ride freely during window movement.

Figures 5, 6 and 7 illustrate a modified form of window guiding means, which may be readily used in place of the embodiment of the invention just described. The channel bar 20a is provided on one end with a guide device 33a, which may be the same as the guide 33 above described. The guide is shown engaging one of the rails 35, the opposite rail being omitted from Figure 5.

The guide assembly for the other side of the bar 20a, indicated generally at 51, includes a depending bracket 52 welded to the under side of the channel 20a and shaped to support a plate or arm 53, which is pivoted at 55 at its lower end for swinging movement in a vertical plane to move a rail engaging channel 56 carried thereby toward and away from the guide rail 35. The plate 53 is adapted to be secured in position of use by a bolt 57 carried by the member 52 and projecting through an arcuate slot 58 in the bracket plate 52.

With the plate in the position shown in broken lines in Figure 6, the window may be readily installed and the plate thereafter moved into rail engaging position. After the plate 53 has been secured in its left hand position (Figure 6) with the rail engaging channel 56 in the desired vertically disposed position, the plate 41 is then adjusted horizontally with respect to the adjacent rail 35 until a satisfactory sliding fit is established. Thereupon, the nuts are tightened on the bolts to hold the plate 41 in the adjusted position.

In each of the forms above described it will be observed that the upper end of the plate 41 guidingly engages a shoulder 41a in the bracket plate 40, thereby to insure more nearly rectilinear sliding movement of the guide plate 41.

From the above, it will be manifest that the window glass can be readily installed in the vehicle door or body and as simply removed. The guide rails are engaged by each of the guide devices with just the right amount of clearance to insure free and easy window glass movement but with sufficient closeness to militate against the parts becoming disengaged. Only one side requires any care of adjustment, since the opposite side, that which includes the swingable arm, has a predetermined movement, and, so long as the workman rocks that arm to its limit of movement, it will be properly positioned. Thus, not only is the job of installing the window glass materially simplified but also proper guiding of the window glass is achieved in a most efficient manner in which the chances of error are greatly reduced if not entirely eliminated.

It is to be understood that numerous changes in details of construction, arrangement and operation may be effected without departing from the spirit of the invention especially as defined in the appended claims.

What I claim is:

1. A guide device for a vehicle window panel adapted to be mounted in a window frame for up and down sliding movement into and out of a window well, said guide device including guide members adapted to be mounted on the bottom of the window panel for movement in planes transverse to the sliding movement of the window toward and away from upright guide rails within the well, one member constituting a pivotally mounted arm having an elongate rail engaging channel strip fixed thereto, means to limit the swinging movement of said pivoted arm to a predetermined position with its channel strip in up and down position suitable for engagement with the respective rail, the other guide member constituting a slidable element having an elongate rail engaging channel strip fixed thereto, and a mounting for said slidable element enabling same to be adjusted to and from its guide rail.

2. A guide device for a vehicle window panel adapted to be mounted in a window frame for up and down sliding movement into and out of a window well, said guide device including guide members adapted to be mounted on the bottom of the window panel for movement in planes transverse to the sliding movement of the window toward and away from upright guide rails within the well, one member constituting an arm having fixed to one side a rail-engaging channel strip, a pivotal mounting for one end of said arm, said arm having an arcuate slot, a bolt and nut assembly engaging in said slot, the length of said slot being so chosen that upon extreme movement of the arm in one direction said channel strip is disposed in predetermined up and down position suitable for rail engagement, the other guide member including a rail-engaging channel strip, and means enabling movement of the latter with respect to its rail for effecting fine guide adjustment.

3. A guide device for a vehicle window panel adapted to be mounted in a window frame for up and down sliding movement into and out of a window well, said guide device including a swinging guide member adapted to be mounted on the bottom of the window panel for movement in the direction of the plane of the window panel, a support for said guide member, a bolt on one of said support and guide members extending through an arcuate slot in the other of said support and guide members, the slot being of such length that upon movement of the guide member to a limit determined by engagement of the bolt with one end of the slot the guide member is disposed in the desired guiding position.

BURTON S. FLORADAY.

REFERENCES CITED

The following references are of record in the file of this patent:

UNITED STATES PATENTS

| Number | Name | Date |
|---|---|---|
| 1,680,886 | Janoir | Aug. 14, 1928 |
| 1,689,132 | Haarnagell | Oct. 23, 1928 |
| 1,713,088 | Nicholson | May 14, 1929 |
| 1,913,583 | Carr | June 13, 1933 |
| 1,928,056 | Holt et al. | Sept. 26, 1933 |
| 2,059,027 | Potter | Oct. 27, 1936 |
| 2,236,451 | Roethel | Mar. 25, 1941 |
| 2,283,002 | Floraday | May 12, 1942 |
| 2,304,640 | Joachim | Dec. 8, 1942 |
| 2,326,532 | Graebner | Aug. 10, 1943 |

FOREIGN PATENTS

| Number | Country | Date |
|---|---|---|
| 276,125 | Great Britain | Aug. 25, 1927 |